(No Model.)
F. S. CHURCH.
ROLLER BEARING.
No. 522,648. Patented July 10, 1894.
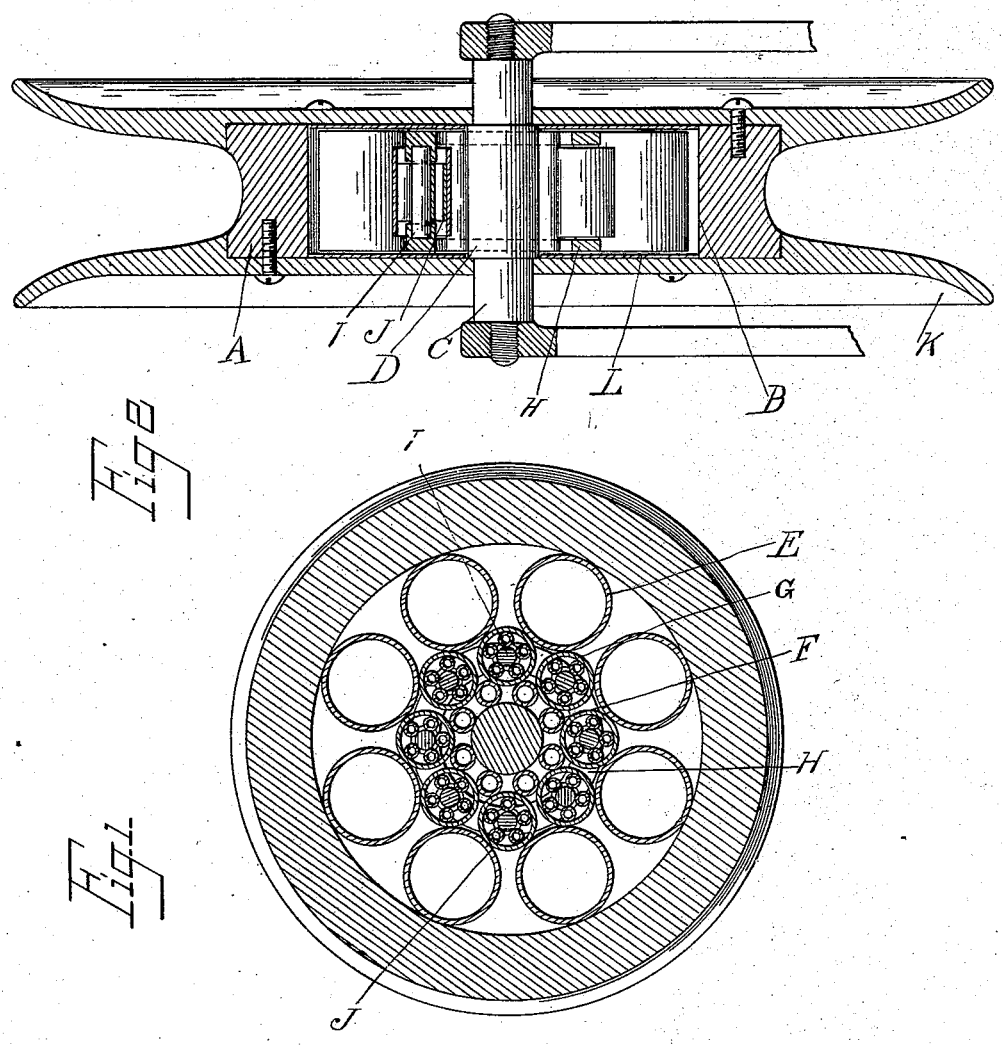
Witnesses
Otto F. Barthel
[signature]
Inventor
Frank S. Church,
By [signature]
Atty's.
THE NORRIS PETERS CO., PHOTO-LITHO., WASHINGTON, D. C.

UNITED STATES PATENT OFFICE.

FRANK S. CHURCH, OF DETROIT, MICHIGAN, ASSIGNOR OF ONE-HALF TO W. FITZ-HUGH EDWARDS, OF SAME PLACE.

ROLLER-BEARING.

SPECIFICATION forming part of Letters Patent No. 522,648, dated July 10, 1894.

Application filed August 26, 1893. Serial No. 484,124. (No model.)

*To all whom it may concern:*

Be it known that I, FRANK S. CHURCH, a citizen of the United States, residing at Detroit, in the county of Wayne and State of Michigan, have invented certain new and useful Improvements in Roller-Bearings, of which the following is a specification, reference being had therein to the accompanying drawings.

The invention consists in the peculiar construction and arrangement of the rollers to form a bearing between the wheel and shaft, and further in the peculiar construction, arrangement and combination of the various parts.

In the drawings, Figure 1 is a vertical, central section through a trolley wheel to which my invention is applied. Fig. 2 is a central cross section thereof.

While I have shown my invention as applied to a trolley wheel for overhead electric railways for which it is especially well adapted it is evident that it can as well be applied to other constructions, and I do not desire to limit myself to that application.

A is the hub of the wheel, centrally apertured and having an inner bearing B on its inner face concentrically arranged.

C is the shaft.

D is an enlarged journal on the shaft corresponding in width substantially to the width of the roller bearing.

The roller bearing consists of three series of rollers, an outer series E, an inner series F and an intermediate series G, the inner series of rollers bearing on the outer face of the journal D, and the inner face on the middle series while the outer series bear on the inner face of the bearing B and the outer face of the intermediate series, the rollers of each series being arranged between corresponding pairs of the adjacent series to space the same and nicely fitted.

The diameters of the rollers increase from the inner series outwardly, so that the increase in speed between the surface of the shaft and the surface of the bearing B will be provided for to prevent the slippage of the rollers upon each other, or in other words, to insure a rolling contact between the rollers and the bearing.

The intermediate series of rollers form the spacing rollers and are held in fixed relation to each other, and with the other rollers, by means of a frame, which consists preferably of rings H, at opposite ends of the rollers connected together by shafts I, which pass centrally through these intermediate rollers. Between these shafts and the intermediate rollers I provide a roller bearing consisting of a series of rolls J bearing on one side against the shaft I and on the other against the inner face of the rolls G. I thus provide a roller bearing between this frame and the spacing rollers which reduces the friction to a minimum.

In applying my invention to a trolley wheel I form the central or hub section in one piece and the sides and flanges K also in one piece, secured on the hub in any suitable manner.

L is a wear plate against which the ring and the ends of the rollers F and E may bear.

What I claim as my invention is—

1. A roller bearing comprising a fixed shaft, a hub apertured to surround the shaft, an enlargement on the shaft within the hub, interposed rollers consisting of an outer series bearing against the hub, an inner series bearing against the fixed shaft, and an intermediate series of hollow spacing rollers between the inner and outer series of rollers, a ring-frame located at opposite ends of the intermediate rollers, shafts connecting the rings of the frame and passing through the intermediate rollers, and bearings between the shafts and intermediate rollers, substantially as described.

2. A roller bearing comprising a fixed shaft, a hub apertured to surround the shaft, an enlargement on the shaft within the hub, interposed rollers consisting of an outer series bearing against the hub, an inner series bearing against the fixed shaft, and an intermediate series of hollow spacing rollers between the inner and outer series of rollers, a ring-frame located at opposite ends of the intermediate rollers, wearing plates at the ends of the rollers, shafts connecting the rings of the frame and passing through the intermediate rollers, and roller bearings between the shafts and intermediate rollers, substantially as described.

In testimony whereof I affix my signature in presence of two witnesses.

FRANK S. CHURCH.

Witnesses:
M. B. O'DOGHERTY,
OTTO F. BARTHEL.